United States Patent Office 3,345,178
Patented Oct. 3, 1967

3,345,178
PRECIPITATION OF BACITRACIN UPON AN INERT, INSOLUBLE, INORGANIC SUPPORT FOR USE IN ANIMAL FEEDS
Charles H. Monroe and George E. Ward, Newaygo, Mich., assignors to Dawe's Laboratories, Inc., Chicago, Ill., a corporation of Illinois
No Drawing. Filed Oct. 18, 1963, Ser. No. 317,160
7 Claims. (Cl. 99—2)

This invention relates to the production of the antibiotic, bacitracin, and more particularly it relates to the separation of bacitracin from fermentation beers in a form which is suitable for use in animal feeds.

Bacitracin, an antibiotic produced by bacteria of the *Bacillus licheniformis* group, was discovered in 1943 by Meleney and Johnson of Columbia University and was described by Johnson, Anker, and Meleney in Science, volume 102, pages 376–377 (1945), and by Anker, Johnson, Goldberg, and Meleney in Journal of Bacteriology, volume 55, pages 249–255 (1948).

Bacitracin is a mixture of water-soluble polypeptides having marked activity against gram-positive bacteria and little or no activity against gram-negative organisms. Bacitracin is used particularly in topical applications, and it has also found very wide use in animal nutrition and animal medication; it has great value in the nutrition of poultry and swine, where it stimulates growth and improves the efficiency of the conversion of feed to animal substance.

It is an object of this invention to separate bacitracin from bacitracin-containing fermentation beers in an efficient and economical manner and in good yield.

It is a further object of this invention to produce a product which contains a relatively large proportion of bacitracin.

It is a still further object of the invention to produce a bacitracin product which is readily incorporated in animal feeds and which is stable when so incorporated.

The economical production of bacitracin in stable, usable form has presented many problems. Crude bacitracin used for animal feed applications has been prepared by concentrating and drying the entire fermentation beer from *Bacillus licheniformis* fermentations; this recovery procedure suffers the disadvantage that much bacitracin activity is lost during the concentrating and drying steps, due to the fact that bacitracin is unstable upon prolonged heating in aqueous solutions or when in contact with damp substances.

n-Butanol was used for extraction of bacitracin from fermentation beers by Anker, Johnson, Goldberg and Meleney, Journal of Bacteriology, volume 55, pages 249–255 (1948), and by Johnson and Meleney, U.S. Patent 2,498,165, but the extraction was non-selective, incomplete, and was complicated by persistent emulsions.

Goorley (U.S. Patent 2,457,887) prepared purified bacitracin from relatively concentrated solutions (2200 units per ml.) of partially purified bacitracin by fractional precipitation with ammonium sulfate at 0° to 5° C. This method is not applicable to crude fermentation beers of much lower bacitracin titer, such as 100–500 units per ml.

Regna and Solomons (U.S. Patent 2,556,375) separated bacitracin from fermentation broths by precipitation with a dye, the monosodium salt of 1-(4-chloro-o-sulfophenyl)-5-hydroxy-3-methyl-4-(p-tolysulfonoxyl)-phenylazo pyrazole. This dye precipitate is, of course, not suitable for animal feeds.

Darker (U.S. Patent 2,567,698) removed bacitracin from fermentation beer by adsorption onto activated carbon followed by elution with aqueous acid solutions. Neither the carbon adsorbate nor the acidic eluate are suitable for use in animal feeds.

Charney (U.S. Patent 2,582,921) adsorbed bacitracin from clarified fermentation beers onto zeolitic materials such as bentonite, kaolin, magnesium silicate, fuller's earth, and diatomaceous earth. The antibiotic was eluted from these adsorbents with alkaline solutions to obtain bacitracin of high purity.

Wehrmeister (U.S. Patent 2,739,063) absorbed bacitracin from fermentation broth onto activated clay, such as bentonite, then dried the adsorbate to obtain a product suitable for animal feeds. The Wehrmeister products contained 1335 to 2115 units of bacitracin per gram of adsorbate, which is equivalent to about 14.4 to 22.8 grams of bacitracin per pound of adsorbate, corresponding to 3% to 5% bacitracin. Studies of the Wehrmeister process have shown that large quantities of activated clay must be used to obtain good recovery of bacitracin from fermentation broth; that large losses of bacitracin potency occur during drying of the adsorbate; and that the final dry product does not contain sufficiently high concentrations of bacitracin to meet present-day requirements of the animal feed industry. Currently, it is preferred to use bacitracin-containing products with potencies in the range 50 to 150 grams per lb. (11% to 33% bacitracin) in formulating concentrated animal feed supplements.

Baron (U.S. Patent 2,774,712) recovered bacitracin from fermentation beers by precipitation as the bacitracin-methylene disalicylic acid compound. This bacitracin derivative is unsuitable for feed use because of the analgesic properties of its salicylate content, and because of its high cost.

Metal salts of bacitracin suitable for use in animal feed have been described. Chornock (U.S. Patent 2,809,892) prepared zinc bacitracin, and Zorn prepared several bacitracin salts, such as the nickel salt (U.S. Patent 2,903,357), the manganese salt (U.S. Patents 2,985,533 and 2,985,-534), and the cobalt salt (U.S. Patent 3,021,217). The production of metal salts of bacitracin for animal feed use presents numerous problems, such as incomplete precipitation of the desired salts from the fermentation beers, filtration problems, and the presence of such quantities of impurities as to lower the bacitracin content to such low levels that the products become unsuitable for incorporation in very concentrated animal feed supplements.

The process of our invention yields bacitracin products of high potency and in good yield, with only a few processing steps and without processing difficulties.

We have found that bacitracin, although it is very soluble in pure water, has a limited solubility in saturated aqueous solutions of certain salts, such that bacitracin can be substantially completely precipitated from aqueous fermentation broths or broth concentrates when these salts are added to the point of saturation under controlled conditions. We have found that it is advantageous to permit the dissolved substances normally present in the fermentation beer to provide a substantial proportion of the solids needed to attain saturation, and to supplement these with the addition of selected salts to arrive at the point of saturation. Salts which may be added to precipitate bacitracin from aqueous solutions, such as fermentation beers, in the process of our invention include the chlorides and sulfates of alkali and alkaline earth metals, such as sodium, potassium, ammonium, calcium, magnesium, barium and the like, as represented by the compounds sodium chloride, sodium sulfate, calcium chloride, magnesium sulfate, and ammonium sulfate.

We have found that fermentation beers containing from about 1% to about 20% dissolved solids which originated in the fermentation mash are suitably used as sources for the precipitation of bacitracin by the method of our invention. However, we prefer to use fermentation beers or concentrates thereof which contain about 10% to 15% dissolved solids of fermentation mash origin because such systems require little additional salt and because at these concentrations bacitracin does not separate until such salts are added. When fermentation beers or concentrates thereof contain more than about 15% dissolved solids, bacitracin begins to separate as a gummy mass which clings to the walls of the container and is difficult to recover in a desirable form.

Bacitracin-containing fermentation beers which contain relatively small quantities of dissolved solids, such as below about 5% to 10%, may be concentrated to a solids content within the desired range by conventional means at low temperatures without appreciable loss of bacitracin activity. Thus, they may be concentrated in single-effect or multiple-effect evaporators in which the bacitracin-containing solution is exposed to temperatures not above 45° to 50° C.

In order to obtain a bacitracin product which can be readily separated, dried, stored, and incorporated in animal feeds, we mix with the bacitracin-containing beer or concentrate thereof, before salt addition, from about 0.5% to about 2.0% (weight per volume) of a finely divided, inert, insoluble, inorganic substance, such as clay, sand, fuller's earth, or diatomaceous earth. This chemically-inert material serves, not as an adsorbent, but as a supporting solid upon which the bacitracin precipitates when salt is added to the fermentation beer. The properties of the final product, such as flowability and dustiness, may be controlled to some extent by the nature of the supporting solid provided. Supporting agents of very small particle size tend to give dusty products, while those of larger size give free-flowing, non-dusty products. Diatomaceous earths have been found suitable for this application and Celite No. 560, a diatomaceous filter aid supplied by Johns-Manville Corp., has been especially satisfactory.

We have proved that the above mentioned, chemically-inert, insoluble, inorganic substances, when used in the manner described, do not adsorb bacitracin from the bacitracin-containing aqueous solutions. This was shown by removing the added insoluble substances prior to salt addition and assaying them for bacitracin, with the result that little or no antibiotic activity was found. Also, we have found that clays and earths, such as bentonite, have a very limited capacity for adsorbing bacitracin, being unable to adsorb more than about 10% of their weight in bacitracin. Since the products produced by the method of our invention contain as much as 36% to 41% bacitracin, it is obvious that the insoluble, inorganic substances added are functioning as foci for the deposition of precipitated bacitracin, and not as adsorbents.

The degree of acidity of the fermentation beer during the precipitation of the bacitracin product of this invention is not particularly critical. The process may be operated over the pH range 2.0 to 7.0, and it is preferably conducted at pH 4.0 to 6.0, because bacitracin is most stable at this pH range.

The precipitation step of the process may be conducted at temperatures within the range 0° to 40° C. Conveniently, it can be conducted at room temperatures, but it is preferred to conduct the precipitation at temperatures of 15° to 20° to which the fermentation beer or concentrate thereof may have been cooled prior to processing.

The precipitation procedure described herein may be applied to filtered or clarified bacitracin-containing fermentation beers or concentrates thereof, or it may be applied to whole, unfiltered and unclarified bacitracin-containing fermentation beers or concentrates thereof. The bacitracin feed product will be of higher potency when it is made from filtered, clarified beers, but it is often economically advantageous to produce the bacitracin feed product from unfiltered, unclarified beers, because the insoluble beer solids have nutritional value, are harmless, and merely dilute the bacitracin content of the antibiotic feed product.

The process of our invention is conducted in the following manner: A bacitracin-containing fermentation beer at pH below 7 is concentrated, if necessary, at a temperature of not over 50° C. until the dissolved solids are within the range 1% to 20%, and the beer is then adjusted to a temperature within the range 0° to 40° C. There is then added, with stirring, from 0.5% to 2.0% by weight of a finely-divided, chemically-inert, insoluble, inorganic substance such as diatomaceous earth. After the inert, insoluble, inorganic substance is dispersed throughout the mass, a selected salt is added in increments, with continuous stirring, to the point of saturation; that is, until no further salt will dissolve in the liquid mass. (The selected salt may be sodium chloride, sodium sulfate, calcium chloride, magnesium sulfate, or ammonium sulfate, or other chlorides or sulfates of alkali or alkaline earth metals, or mixtures thereof.) The addition of the salt causes the bacitracin to precipitate on the particles of insoluble, inorganic substance, yielding a solid mass which is readily separated from the reaction mass by conventional separation means, such as filtration or centrifugation. The separated solid is then dried in conventional dryers, preferably at low temperatures, to yield a bacitracin-containing product which is suitable for incorporation in animal feed or in animal feed supplements.

The addition to the reaction mass of more salt than is required to saturate the aqueous system is usually unnecessary and uneconomical. However, slight excesses of salt are usually not desirable since they sometimes aid in subsequent filtration and drying.

The dried bacitracin-containing product produced by our process contains from about 5% to about 50% bacitracin, depending upon the potency of the fermentation beer and upon whether the beer is filtered before being treated with inert, insoluble inorganic substance and salt.

The bacitracin-containing precipitate produced by the instant invention may be used for animal feed, as mentioned above, or it may serve as a source of partially purified bacitracin for the production of highly purified bacitracin. The bacitracin product produced by the instant invention is stable when incorporated in animal feeds and in animal feed supplements.

Bacitracin is assayed microbiologically by the procedure shown on pages 560–561 of the ninth edition of Official Methods of Analysis of the Association of Official Agricultural Chemists. In the animal feed industry, 42,000 units of feed-grade bacitracin is considered to be equivalent to one gram of bacitracin.

To indicate the manner in which our invention may be practiced, the following examples are cited, without limitation of the scope of the invention thereto:

*Example 1*

A bacitracin fermentation broth was adjusted to pH 4.3, filtered, and the filtrate was found to contain 92 units of bacitracin per ml. The filtered broth was concentrated in vacuo at 45° C. to obtain a solution which assayed 342 units per ml., and which contained 10.3% dissolved solids. The concentrated solution was cooled to 20° C. and to 1600 ml. of the concentrate were added, with good mixing, 16 grams of Hyflo filter aid (a diatomaceous earth) and 400 grams of sodium chloride supplied in 50-gram increments, thereby forming a saturated solution. A precipitate formed, consisting principally of bacitracin deposited on the particles of Hyflo filter aid. The precipitate was separated by filtration and dried. The dry weight was 27.8 grams and the precipitate assayed 36.4% bacitracin. The dry product was free-flowing and was very suitable for incorporation in animal feeds and animal feed supplements. The bacitracin recovery efficiency, from concentrate to final product, was 77.7%.

Example II

A bacitracin-containing fermentation beer which assayed 120 units of bacitracin per ml. and 0.04 gram of dissolved solids per ml. was adjusted to pH 5.0. Three liters of this adjusted broth were concentrated at 50° C. to a volume of one liter; the concentrated broth assayed 340 units of bacitracin per ml. and 12.0% dissolved solids. (Insoluble solids were also present because the broth had not been filtered.) To the one liter of concentrate was added 12 grams of Celite No. 560, a diatomaceous earth, and the mass was stirred vigorously at room temperature. When the Celite was well dispersed throughout the mass, magnesium sulfate was added in 50-gram increments, with continuous stirring, until the solution was saturated with this salt; a total of 300 grams of magnesium sulfate was required. As the salt was added, bacitracin precipitated on the particles of Celite. After saturation of the solution with the salt, the insoluble solids were separated by filtration and dried. The dry product assayed 11% bacitracin, weighed 59 grams, and was a free-flowing powder, suitable for use in animal feeds. The bacitracin recovery efficiency from beer to final dry product was 75.5%.

Example III

A bacitracin-containing fermentation broth which assayed 180 units of bacitracin per ml. and which contained 4.8% dissolved solids was adjusted to pH 5.5. To two liters of this broth at 20° C. was added 20 grams of fuller's earth, with constant stirring. There was then added ammonium sulfate to saturate the aqueous solution, a total of 1400 grams being required. The bacitracin precipitated on the dispersed fuller's earth as the salt was added. The solids were separated on a centrifuge and were dried at low temperature to yield 57.0 grams of dry powder which contained a total of 259,000 units of bacitracin, which corresponded to 72% of the bacitracin originally present in the broth. The dry powder contained 10.8% bacitracin.

Example IV

A bacitracin-containing fermentation beer was adjusted to pH 4.5, filtered, and concentrated in vacuo at 47° C. to obtain an aqueous solution which contained 412 units of bacitracin per ml., and 14% dissolved solids. Two liters of this concentrate was cooled to room temperature and 15 grams of finely divided kaolin was added and mixed thoroughly throughout the mass. There was then added three 100-gram portions of sodium sulfate ($Na_2SO_4 \cdot 10H_2O$) with constant stirring to saturate the solution and to cause the bacitracin to precipitate on the kaolin. The insoluble material, consisting principally of kaolin and bacitracin, was separated by filtration and was dried to obtain 37 grams of dry powder which assayed 41% bacitracin, corresponding to 78.7% recovery of the bacitracin present in the concentrated fermentation beer.

Example V

Two liters of the same concentrated beer used in Example IV, containing 412 units of bacitracin per ml. and 14% dissolved solids, was cooled to room temperature and mixed with 22 grams of diatomaceous earth. There was then added, in 100-gram portions with constant stirring, 1100 grams of calcium chloride ($CaCl_2 \cdot 6H_2O$) to saturate the solution and to cause the bacitracin to precipitate on the diatomaceous earth. The insoluble solids were separated by centrifuging and dried to obtain 42 g. of dry cake which, upon assay, was found to contain 660,000 units of bacitracin, corresponding to 81% of the antibiotic in the concentrated fermentation beer. The dry cake contained 37.6% bacitracin and was suitable for incorporation in animal feed supplements.

It will be understood that changes may be made in the details of formulation and processing without departing from the spirit of the invention, especially as defined in the following claims.

We claim:

1. A process for producing bacitracin from fermentation beers containing up to 500 units per ml. which comprises adjusting the bacitracin-containing fermentation beer to a dissolved solids content in the range of 1% to 20%, adjusting the pH to within the range of 2.0 to 7.0, adjusting the temperature to within the range of 0° to 40° C., dispersing from 0.5% to 2.0% of a finely divided, inert, insoluble, inorganic material throughout the mass as a support for the precipitation of bacitracin, saturating the mass with a salt selected from the group consisting of a chloride and sulfate of a metal selected from the group consisting of an alkali metal and alkaline earth metal and mixtures thereof, precipitating bacitracin on the finely divided inert, insoluble, inorganic material, and then separating and drying the insoluble mass to produce a solid containing bacitracin.

2. A process as claimed in claim 1 in which the salt is selected from the group consisting of sodium chloride, calcium chloride, sodium sulfate, magnesium sulfate and ammonium sulfate.

3. A process as claimed in claim 1 in which non-bacitracin insoluble fermentation solids are separated from the bacitracin-containing fermentation beer before the addition of finely divided, inert, insoluble, inorganic material and salt.

4. A process as claimed in claim 1 in which the dissolved solids content of the bacitracin-containing fermentation beer is adjusted to about 10% to 15%.

5. A process as claimed in claim 1 in which the pH of the bacitracin-containing fermentation beer is adjusted to within the range of 4.0 to 6.0.

6. A process as claimed in claim 1 in which the temperature is maintained within the range of 15° to 20° C.

7. A process for producing a bacitracin-containing product for use in animal feeds which comprises separating non-bacitracin insoluble fermentation solids from a bacitracin-containing fermentation beer containing up to 500 units of bacitracin per ml., adjusting the dissolved solids content of the beer filtrate within the range of 1% to 20%, maintaining the temperature within the range of 0° to 40° C., maintaining the pH within the range of 2.0 to 7.0, dispersing from 0.5% to 2.0% of a finely divided inert, insoluble, inorganic material throughout the mass, saturating the mass with sodium chloride thereby causing bacitracin to precipitate on the finely divided insoluble, inorganic material, and separating and drying the insoluble solids to produce a bacitracin-containing dry product.

References Cited

UNITED STATES PATENTS

| | | | |
|---|---|---|---|
| 2,457,887 | 1/1949 | Goorley | 167—65 |
| 2,582,921 | 1/1952 | Charney | 167—65 |
| 2,739,063 | 3/1956 | Wehrmeister | 99—2 |

OTHER REFERENCES

Webster's Third International Dictonary, 3rd ed., p. 2006 (1961).

A. LOUIS MONACELL, *Primary Examiner.*

D. DONOVAN, H. H. KLARE, *Assistant Examiners.*